No. 714,078. Patented Nov. 18, 1902.
A. A. WHITLEY.
GEARING FOR STENTERING OR OTHER MACHINES.
(Application filed May 16, 1902.)

(No Model.)

WITNESSES:
G. W. Wright
Geo. C. Abbe.

INVENTOR
ALFRED AUSTIN WHITLEY
BY
Howson and Howson
HIS ATTORNEYS.

UNITED STATES PATENT OFFICE.

ALFRED AUSTIN WHITLEY, OF BURY, ENGLAND.

GEARING FOR STENTERING OR OTHER MACHINES.

SPECIFICATION forming part of Letters Patent No. 714,078, dated November 18, 1902.

Application filed May 16, 1902. Serial No. 107,628. (No model.)

*To all whom it may concern:*

Be it known that I, ALFRED AUSTIN WHITLEY, engineer, a subject of the King of Great Britain and Ireland, residing at 2 Malvern Villas, Chesham road, Bury, in the county of Lancaster, England, have invented certain new and useful Improvements in Gearing for Stentering or other Machines; and I do hereby declare the following to be a full, clear, and exact description of the invention, such as will enable others skilled in the art to which it appertains to make and use the same.

My invention has for its object to provide stentering-machines with a simple and efficient gear by means of which the fabric passing through the said machines can be straightened by giving a variation of speed between the chain-wheels by which the chains carrying the clips which clip each side of the fabric are driven, the arrangement being such that the gear occupies but a small space and is powerful and durable.

Figure 1:
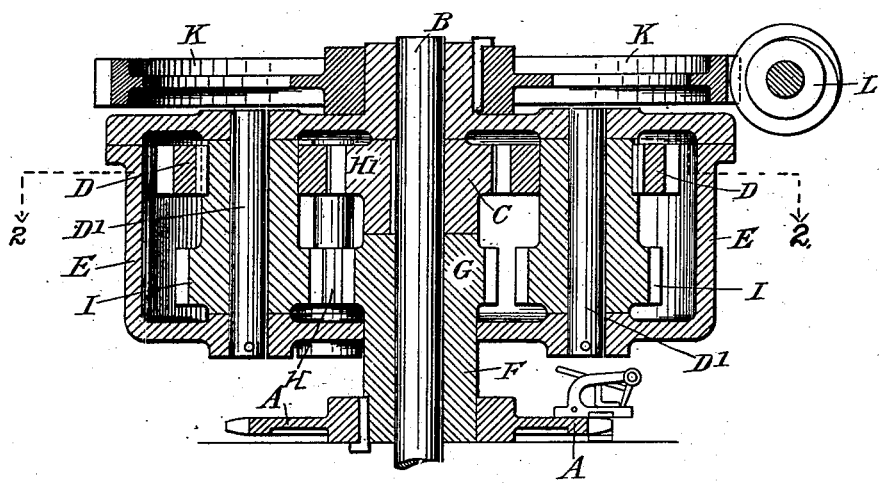
Figure 2:
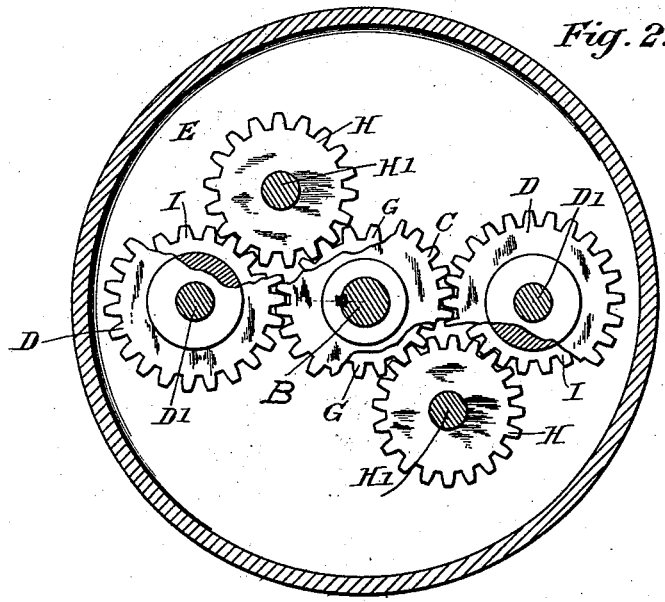

Figure 1 represents in vertical section, and Fig. 2 in horizontal section on the line 2 2, Fig. 1, an arrangement of gearing according to my invention.

A is the chain-wheel whose speed is to be regulated, the said chain-wheel being fixed to a sleeve G, mounted loosely on the shaft B, on which shaft B is keyed a spur-pinion C, in gear with two spur-wheels D, mounted to rotate around spindles D', secured in a casing E, which is capable of rotating on the shaft B. The part of the sleeve F which is in the casing E is formed with or has fixed to it a pinion G, which through intermediate toothed wheels H, mounted to rotate on studs H', carried by the casing E, is geared to the spur-wheels I, each connected with one of the aforesaid wheels D, so that the wheels D and I of each pair rotate together. The casing E has secured to it a worm-wheel K, with which gears a worm L on a shaft capable of being rotated from any convenient part or parts of the stentering-machine. So long as the casing E is stationary (as it is under normal conditions) the chain-wheel A will be driven from the chain-wheel-driving shaft B at the same speed as that shaft B through the medium of the gear-wheels C, D, I, H, and G within the stationary casing. If, however, rotary motion in one direction or the other be imparted to the casing E (by means of the worm L and worm-wheel K) while the driving-shaft B is rotating, the gearing within the casing will act more or less as a planetary gear, and consequently the normal speed at which the wheel A is driven from the shaft B will be retarded or accelerated, according to the speed at which and the direction in which the casing E is being turned.

If desired, the teeth of the pinions C and G can be made broad enough to allow the surrounding wheels to be placed on different levels, so as to work on different parts of the teeth of the said pinions C and G.

Having now particularly described and ascertained the nature of the said invention and in what manner the same is to be performed, I declare that what I claim is—

In a stentering-machine, means for imparting variable motion to the chains of clips, by which the edges of the fabric are held; the said means consisting of the combination with the chain-wheel, around which one of the chains of clips passes, of a chain-wheel-driving shaft having a spur-pinion fast thereon, a spur-pinion fast with the chain-wheel, the said chain-wheel and its pinion being mounted loosely on the chain-wheel shaft, a casing mounted loosely on the said shaft, studs in the casing each carrying a pair of spur-wheels connected together and mounted loosely on the said studs, one of each of the said pairs of spur-wheels gearing with the aforesaid spur-pinion fast on the chain-wheel shaft and the other spur-wheel of each pair gearing with intermediate toothed wheels mounted on two other studs in the casing and gearing with the aforesaid spur-pinion mounted loosely on the chain-wheel shaft and means for rotating the casing in either direction so as to vary the speed of rotation of the chain-wheel substantially as hereinbefore described.

In testimony whereof I affix my signature in presence of two witnesses.

ALFRED AUSTIN WHITLEY.

Witnesses:
ARTHUR HOLT,
ALBERT EDWARD ROBERTS.